US006891846B2

(12) United States Patent
Shahar et al.

(10) Patent No.: US 6,891,846 B2
(45) Date of Patent: May 10, 2005

(54) METHOD AND APPARATUS FOR A TRAFFIC SHAPER

(75) Inventors: Boaz Shahar, Ra'anana (IL); Stefania Gandal, Herzlia (IL); Aviram Hertzberg, Kochav Yair (IL); David Sitbon, Raanana (IL)

(73) Assignee: Freescale Semiconductor, Inc., Austin, TX (US)

( * ) Notice: Subject to any disclaimer, the term of this patent is extended or adjusted under 35 U.S.C. 154(b) by 852 days.

(21) Appl. No.: 09/884,377

(22) Filed: Jun. 18, 2001

(65) Prior Publication Data

US 2003/0007494 A1 Jan. 9, 2003

(51) Int. Cl.[7] .............................................. H04L 12/54
(52) U.S. Cl. ...................... 370/429; 370/412; 714/706
(58) Field of Search ................................. 370/229, 230, 370/230.1, 231, 232, 233, 234, 235, 391, 394, 395.31, 412, 428, 429, 411; 714/706

(56) References Cited

U.S. PATENT DOCUMENTS 6,101,193 A * 8/2000 Ohba ......................... 370/429
6,295,295 B1 * 9/2001 Wicklund ................... 370/392
6,324,165 B1 * 11/2001 Fan et al. ................... 370/232
6,477,144 B1 * 11/2002 Morris et al. ............. 370/230.1
6,532,213 B1 * 3/2003 Chiussi et al. ........... 370/230.1

OTHER PUBLICATIONS

Parekh et al., "A Generalized Processor Sharing Approach to Flow Control in Integrated Services Networks: The Multiple Node Case," IEEE/ACM Transactions on Networking, vol. 2, No. 2, Apr. 1994, pp. 137–150.

* cited by examiner

Primary Examiner—Dang Ton
Assistant Examiner—Phuc Tran
(74) Attorney, Agent, or Firm—James L. Clingan, Jr.

(57) ABSTRACT

Packets of data from multiple queues are transferred onto a single channel. Each queue has associated with it a data rate for servicing a packet within the queue. Each queue has an integer that, relative to the other numbers, represents is inversely related to the assigned data rate. Each queue has associated with it a counter and that is loaded with its corresponding integer. The counter values are compared, and the queue corresponding to the lowest counter value has a packet coupled to the channel. The counter of the selected queue is incremented by its integer. The next queue that is selected is the one that corresponds to the counter with the lowest count value after the counter that corresponds to the previously selected queue has been updated.

13 Claims, 1 Drawing Sheet

METHOD AND APPARATUS FOR A TRAFFIC SHAPER

FIELD OF THE INVENTION

This invention relates to communications, and more particularly to shaping the traffic flow of information packets.

BACKGROUND OF THE INVENTION

In high speed communications, and particularly a synchronous transfer mode (ATM) in the telecommunications industry, available bandwidth is at a premium. Thus, there is a continuing need to provide more and more information over a given channel. One of the issues is how the resources on a particular channel are allocated. Often different types of information have different rates and different priorities but are on the same channel. These different rates must all be serviced but may have different priorities and different rates. One technique is simply to take turns but that may be inconsistent with the data rate. Another technique is to service the higher priority. This may result in starvation for the lower priority. This may be an undesirable result, especially if there is a commitment to provide the lower priority.

Accordingly, there is a need to provide multiple queues on a single channel with service that is consistent with the priorities of the queues and not starve the queues with lower priorities.

BRIEF DESCRIPTION OF THE DRAWINGS

Shown in FIG. 1 is block diagram of a circuit for controlling multiple queues according to an embodiment of the invention; and Shown in FIG. 2 is a flow diagram describing a method for using the circuit of FIG. 1.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DESCRIPTION OF THE INVENTION

Described herein is a technique that provides a way to transfer packets of data from multiple queues onto a single channel. In one embodiment each has associated with it a data rate for servicing a packet within the queue. The data rate assigned is relative to the priority of that particular queue. The time for completing the transfer of the packet is calculated and normalized. Thus, each queue has an integer that, relative to the other numbers, represents the time for an access. Each queue has associated with it a counter and that is loaded with its corresponding integer. The counter values are compared, and the queue corresponding to the lowest counter value has a packet coupled to the channel. The counter of the selected queue is incremented by its integer. The next queue that is selected is the one that corresponds to the counter with the lowest count value after the counter that corresponds to the previously selected queue has been updated.

Figure 1:
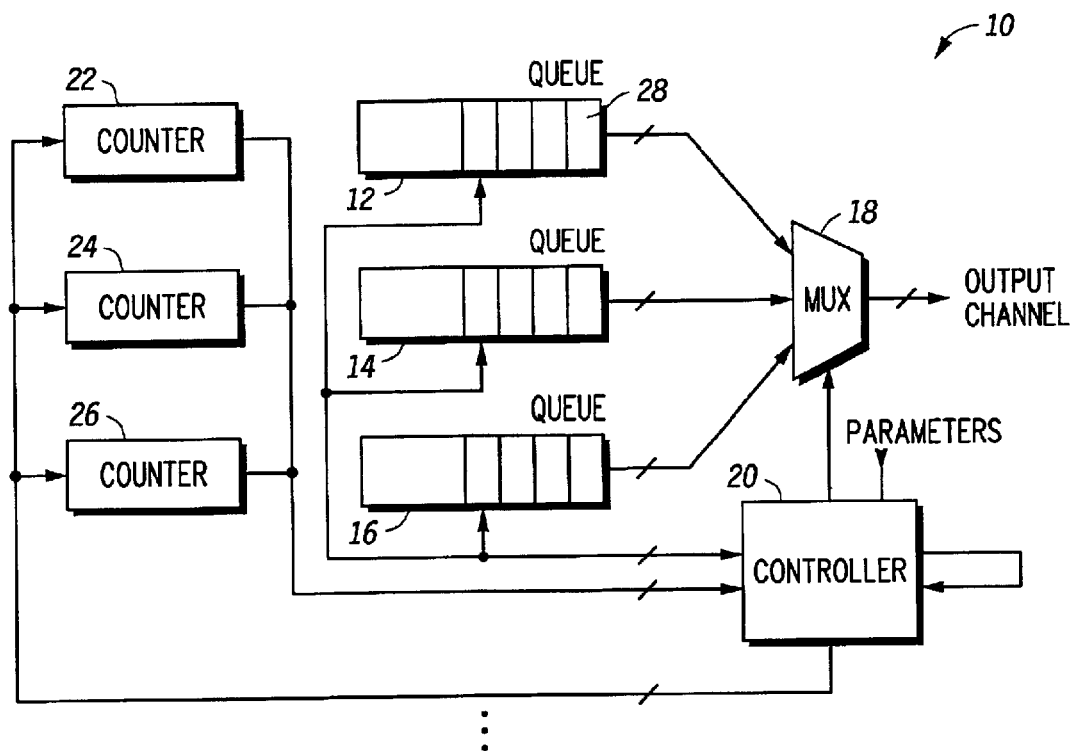

Shown in FIG. 1 is a processing system 10 comprising queue 12, a queue 14, and a queue 16, a multiplexer (mux) 18, a controller 20, a counter 22, a counter 24, and a counter 26. Queues 12 are groups of information that may be FIFoS useful in ATM systems. Also there may additional queues coupled to mix 18. Eight total queues may be a particular effective number, but only three are fully described for ease of understanding. Queues 12, 14, and 16 store packets of information that may be cells of information that may be transmitted as a unit. An example of a cell is cell 28 at the front of queue 28. There are additional cells in queue 12 and more may be loaded. Queues 12–16 each have an output coupled to mix 18. Mix 18 couples one of the outputs of queues 12–16 to an output channel as selected by controller 20. Controller 20 is coupled to counters 22, 24, and 26 for receiving a current count of each counter and for updating each counter 22–24. In this processing system 10 functions as a traffic shaper.

Each queue has assigned to it an integer number that is representative of the bit rate assigned to it. The bit rate assigned to it a given queue may be based on any criteria that a user would wish. Each queue may be correlated to a particular commitment to provide a particular bit rate for some particular purpose. The sum of such commitments should not exceed the maximum bit rate of the output channel otherwise not all of the commitments could be met. The bit rates of all the queues are summed and the percentage of that sum for each queue is calculated. The inverse of the percentage for each is then a measure of the relative time for sending a packet if it were sent at the assigned bit rate. This number then is a measure of the relative frequency that the queue should be serviced. A lower number should be serviced more frequently than a higher number. These inverses of the percentage can be further multiplied by a number to obtain an integer or the numbers may be approximated.

These assigned integers are loaded into controller 20 and into the counters to which they correspond. In this case counter 22 corresponds to queue 12, counter 24 corresponds to queue 14, and counter 26 corresponds to queue 16. With each of counters 22–26 loaded with the integer number associated with its corresponding queue 12–16, controller compares these counter values and determines which is the lowest. The queue 12–16 that has the lowest value in its corresponding counter 22–26 has its output, which is the cell that is next for the queue, selected by controller 20. This is shown as block 30 in FIG. 2. Controller 20 provides the required signal information to mux 18 and to the selected queue 12–16 so that the next cell of the selected queue 12–16 is output to mux 18 and mux 18 couples the output of the selected queue 12–16 to the output channel. This is shown as block 32 in FIG. 2.

After the queue selection, the counter 22–26 that corresponds to the selected queue 12–16 is incremented with its corresponding integer. In effect, each counter thus has a corresponding integer, the integer of its corresponding queue. This incrementing counter by its corresponding integer is shown as block 34 in FIG. 2. Thus, prior to the next selection of a queue 12–16, the previously selected queue has a corresponding counter with a higher value than it did at the time of the prior selection. Controller 20 then performs another comparison with the updated count and makes a new selection. After that selection the counter is updated for that corresponding counter and then a new comparison is continued. This process continues in this manner. Eventually, as the process continues, a counter of counters 22–26 for a selected queue will be in an overflow situation.

Figure 2:
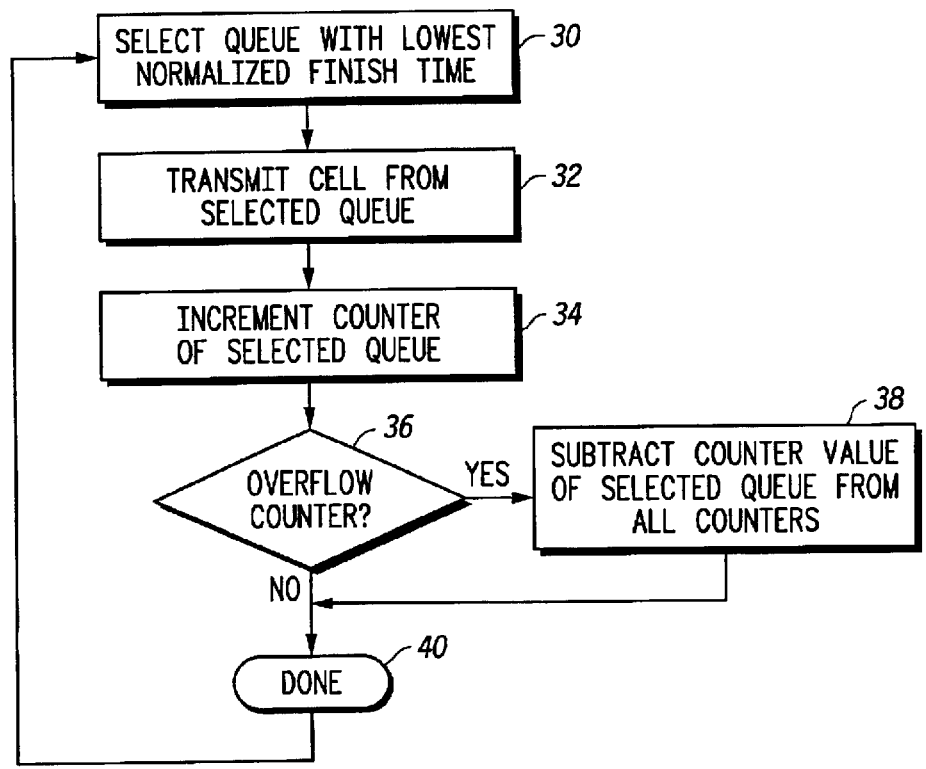

When this happens, which is shown as blocks 36 and 38 in FIG. 2, all of the counters are reduced by the amount in the selected counter, which is the counter in the overflow situation. The amount of the integer which corresponds to the selected counter is carried over into the selected counter, and the other counters have their count reduced by the amount of the selected counter prior to the overflow situation arising. The selected counter of counters 22–26 always has the lowest count because that is the basis for it being selected. After the subtraction of the count of the selected counter of counters 22–26 from the non-selected counters of counters 22–26 and the selected counter of counters 22–26 has been loaded with the amount of its corresponding integer, the process continues. Thus, after each incrementing of the selected counter, there is a determination if that counter is in an overflow situation. Thus the traffic generated by queues 12–16 provide traffic that is shaped to provide a balanced result that is consistent with the bit rates and does not create starving for the queues that may have low bit rates.

For an example of the process assume that queue 12 has an assigned rate of 50 k bits/sec, queue 14 has an assigned rate of 40 k bits/sec, and queue 16 has an assigned rate of 10 k bits/sec. In such a case the total bits/sec is 100K bits/sec with queue 12 having 50%, queue 14 having 40%, and queue 16 having 10%. Thus, the inverse of these percentages are 2 for queue 12, 2.5 for queue 14, and 10 for queue 16. A convenient multiplier of 2 for these results in 4 for queue 12, 5 for queue 14, and 20 for queue 16. Thus queue 12 would be chosen first and counter 22 would be incremented by 4. The table below shows how this would progress.

| Cell number | Value in Counter 22 | Value in Counter 24 | Value in Counter 26 | Selected queue |
|---|---|---|---|---|
| 1 | 4 | 5 | 20 | 12 |
| 2 | 8 | 5 | 20 | 14 |
| 3 | 8 | 10 | 20 | 12 |
| 4 | 12 | 10 | 20 | 14 |
| 5 | 12 | 15 | 20 | 12 |
| 6 | 16 | 15 | 20 | 14 |
| 7 | 16 | 20 | 20 | 12 |
| 8 | 20 | 20 | 20 | 12 |
| 9 | 24 | 20 | 20 | 14 |
| 10 | 24 | 25 | 20 | 16 |
| 11 | 24 | 25 | 40 | 12 |
| 12 | 28 | 25 | 40 | 14 |

This shows the progression of the incrementing of the respective counters as the selected queues provide the cells of data. As seen, the result after the transmission of 10 cells is that five cells from queue 12, four cells from queue 14 and one from queue 16 were selected. This is the same as the percentage calculated of 50%, 40%, and 10%, respectively. In the case of a tie, as in the case for cells 8 and 9, the selected cell is a matter of design choice. In this case the tie was broken by the queue that had the lowest number.

This selection process has the advantage of spreading out the transmissions from the various queues while maintaining the relative data rates, but not starving any of the recipients of the queues. Thus, a recipient expecting the relatively slow rate would periodically receive a cell and not go long periods without any cells then suddenly receive many packets in a row to get caught up.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for transferring packets of data from a first group, a second group, and a third group, comprising the steps of:

identifying a first number, a second number, and third number corresponding to the first, second, and third groups, respectively, wherein the first, second, and third numbers each have a magnitude that is inversely related to an assigned bit rate of the group of the first, second, and third groups to which it corresponds;

providing a first counter, a second counter, and a third counter corresponding to the first, second, and third groups, respectively;

loading the first, second, and third counters with the first, second, and third numbers, respectively;

determining a first selected counter of the first, second, and third counters that has the lowest value;

transferring a packet of data from a first selected group of the first, second, and third groups that corresponds to the first selected counter;

loading the first selected counter with the number of the first, second, and third number that corresponds to the first selected group;

after the step of loading the first selected counter, determining a second selected counter of the first, second, and third counters that has the lowest value;

after the step of loading the first selected counter, transferring a packet of data from a second selected group of the first, second, and third groups which corresponds to the second selected counter; and loading the second selected counter with the number of the first, second, and third numbers that corresponds to the second selected group.

2. The method of claim 1, further comprising:

after the step of loading the second selected counter, determining a third selected counter of the first, second, and third counters has the lowest value;

after the step of loading the second selected counter, transferring a packet of data from a third selected group of the first, second, and third groups which corresponds to the third selected counter; and loading the third selected counter with the number of the first, second, and third numbers that corresponds to the third selected group.

3. The method of claim 1, wherein the step of determining the second selected counter is further characterized as determining if the lowest value is provided by more than one of the first, second, and third counters, and if so, determining the second selected counter by a predetermined criteria.

4. A method for transferring packets of data from a plurality of groups, wherein each group has a corresponding number that bears an inverse relationship to an assigned bit rate of its corresponding group, comprising the steps of:

providing a plurality of counters, each corresponding to a group of the plurality of groups;

loading each of the counters of the plurality of counters with the number of the plurality of numbers that corresponds to the group that said each of the counters corresponds;

determining a first selected counter of the plurality of counters that has the lowest value;

transferring a packet of data from a first selected group of the plurality of groups that corresponds to the first selected counter;

loading the first selected counter with the number of the plurality of numbers that corresponds to the first selected group;

after the step of loading the first selected counter, determining a second selected counter of the plurality of counters that has the lowest value;

after the step of loading the first selected counter, transferring a packet of data from a second selected group of the plurality of groups that corresponds to the second selected counter; and loading the second selected counter with the number of the plurality of numbers that corresponds to the second selected group.

5. The method of claim 4, further comprising:

after the step of loading the second selected counter, determining a third selected counter of the plurality of counters has the lowest value;

after the step of loading the second selected counter, transferring a packet of data from a third selected group of the plurality of groups which corresponds to the third selected counter; and loading the third selected counter with the number of the plurality of numbers that corresponds to the third selected group.

6. The method of claim 4, wherein the step of determining the second selected counter is further characterized as determining if the lowest value is provided by more than one of the plurality of counters, and if so, determining the second selected counter by a predetermined criteria.

7. A traffic shaper for determining the order of transmission of information packets, said information packets are arranged in at least two groups, the shaper comprises:

i) means for utilizing a parameter assigned to each group;

ii) means for obtaining an initial value for each group from the parameter of that group;

iii) a comparator for comparing the initial values of each group, thereby identifying an information packet with the lowest initial value;

iv) a multiplexer for switching the information packet with the lowest initial value to a transmitter;

v) an incremented for incrementing the initial value of the transmitted group with the parameter assigned to the group, so as to calculate an up-dated value;

vi) wherein the comparator compares the up-dated value with the values associated with each of the other groups, thereby identifying a subsequent information packet with the lowest value; and vii) means for switching the subsequent information packet associated with the lowest value to a transmitter.

8. A traffic shaper according to claim 7 wherein the transmitter is located on a chip.

9. A traffic shaper according to claim 7, wherein the comparator is further characterized as determining if more than one information packet has the same value and in the event that more than one packet of information has the same value, selecting the information packet with the lower initial value.

10. A traffic shaper according to claim 7 wherein the said parameter is a function of (the inverse of the transmission rate for an information packet of each group)/(total bandwidth available).

11. A circuit for transferring packets of data from a plurality of groups, wherein each group has a corresponding number that bears an inverse relationship to an assigned bit rate of its corresponding group, comprising the steps of:

a plurality of counters, each corresponding to a group of the plurality of groups;

determining means, coupled to the plurality of counters, for determining a selected counter of the plurality of counters that has the lowest value;

a plurality of data transfer means, each corresponding to a group of the plurality of groups, for transferring data from a selected group that corresponds to the selected counter; and loading means for loading the selected counter with the number that corresponds to the selected group.

12. The circuit of claim 11, wherein the determining means is further characterized as having means for determining if more than one of the groups has the lowest value and if so, determining the selected counter based on predetermined criteria.

13. The circuit of claim 11, further comprising a multiplexer coupled to the plurality of data transfer means.

* * * * *

UNITED STATES PATENT AND TRADEMARK OFFICE
CERTIFICATE OF CORRECTION

PATENT NO. : 6,891,846 B2 Page 1 of 1
APPLICATION NO. : 09/884377
DATED : May 10, 2005
INVENTOR(S) : Boaz Shahar et al.

It is certified that error appears in the above-identified patent and that said Letters Patent is hereby corrected as shown below:

In Column 6, Line 3, Claim No. 7

Change "incremented" to --incrementer--

Signed and Sealed this

Sixth Day of March, 2007

JON W. DUDAS
*Director of the United States Patent and Trademark Office*